United States Patent [19]
Swain et al.

[11] Patent Number: 5,603,290
[45] Date of Patent: Feb. 18, 1997

[54] HYDROGEN ENGINE AND COMBUSTION CONTROL PROCESS

[75] Inventors: Michael R. Swain, Coral Gables; Matthew N. Swain, Miami, both of Fla.

[73] Assignee: The University of Miami, Miami, Fla.

[21] Appl. No.: 528,814

[22] Filed: Sep. 15, 1995

[51] Int. Cl.[6] .................................................. F02M 25/06
[52] U.S. Cl. ........................................ 123/41.86; 123/572
[58] Field of Search ............................... 123/41.86, 572, 123/573, 574

[56] References Cited

U.S. PATENT DOCUMENTS

| | | | |
|---|---|---|---|
| 3,157,169 | 11/1964 | Drysdale | 123/41.86 |
| 3,418,986 | 12/1968 | Scherenberg | 123/41.86 |
| 3,471,274 | 10/1969 | Quigley, Jr. et al. | 48/180.1 |
| 3,616,779 | 11/1971 | Newkirk | 123/41.86 |
| 3,949,719 | 4/1976 | Bellanca et al. | 123/41.86 |
| 4,557,226 | 12/1985 | Mayer et al. | 123/572 |
| 4,616,620 | 10/1986 | Paoluccio | 123/41.86 |
| 4,656,991 | 4/1987 | Fukuo et al. | 123/41.86 |
| 4,721,090 | 1/1988 | Kato | 123/572 |
| 5,231,954 | 8/1993 | Stowe | 123/3 |

OTHER PUBLICATIONS

Copy of excerpt from Acura Integra Service Manual Jan. 1987.

Primary Examiner—David A. Okonsky
Attorney, Agent, or Firm—Austin R. Miller

[57] ABSTRACT

Hydrogen engine with controlled combustion comprises suction means connected to the crankcase reducing or precluding flow of lubricating oil or associated gases into the combustion chamber.

13 Claims, 1 Drawing Sheet

HYDROGEN ENGINE AND COMBUSTION CONTROL PROCESS

GOVERNMENT RIGHTS

The Government has rights in this invention pursuant to a contract awarded by the U.S. Department of Energy. This invention may be manufactured, used and licensed by or for the Government for governmental purposes without payment of royalty.

BACKGROUND OF THE INVENTION

1. Field of the Invention

The invention is directed to a new hydrogen engine and to a process to eliminate abnormal combustion in a hydrogen fueled engine.

Hydrogen combustion can provide excellent energy efficiency and can produce combustion gases having very low NOx content. However, when used as the primary fuel in a conventional internal combustion engine, it experiences abnormal or premature combustion, making it difficult to control and to use as a primary fuel.

2. Description of the Prior Art

Several patents disclose hydrogen as a fuel. For example, Quigley, Jr. (U.S. Pat. No. 3,471,274) discloses a hydrogen combustion engine that utilizes a vacuum exhaust pump to remove products of combustion. A vacuum exhaust pump is connected to an exhaust pipe to remove combustion products when the exhaust ports are uncovered by the piston.

Stowe (U.S. Pat. No. 5,231,954) discloses a hydrogen/oxygen fuel cell for supplementing gasoline, which is said to improve thermal efficiency and reduce emissions. Atmospheric air and accumulated crankcase gases are swept through the crankcase through a crankcase vent hose tube which forms a part of a positive crankcase ventilation (PCV) system.

In previous studies (Ernest, R. P., "A Unique Cooling Approach Makes Aluminum Alloy Cylinder Heads Cost Effective," Ford Motor Company, SAE Paper No. 770832, 1977), it was noted that the principal obstacle to heat transfer in an aluminum cylinder head was the aluminum-coolant interface at locations where low flow rates of coolant and film boiling can occur. The incidence of film boiling on the exhaust ports in the water jacket has been found to coincide with flashback in the engine. This finding is consistent with theoretical analysis and has been noted by others (Withalm, G., and Gelse, W., "The Mercedes-Benz Hydrogen Engine for Application in a Fleet Vehicle," Proceedings of the 6th World Hydrogen Energy Conference, Vienna, Austria, 20–24 Jul. 1986). Since surface ignition is not as large a problem with gasoline-fueled engines as with hydrogen-fueled engines, it has not been necessary, in the past, to carefully design cylinder heads with uniform coolant flow rates. Coolant systems which avoid such nonuniformities in local coolant flow rate have been developed (Ernest, 1977; Finlay, I. C., Gallacher, G. R., Biddulph, T. W., and Marshall, R. A., "The Application of Precision Cooling to the Cylinder-Head of a Small, Automotive, Petrol Engine," SAE Paper 880263).

The problem remains, however, that abnormal combustion takes place when the primary fuel is hydrogen, especially when attempted to be operated at heavy loads for extended periods of time.

SUMMARY OF THE INVENTION

We have discovered that a major source of engine flashback surprisingly comprises leakage or seepage of engine lubricants and associated gases into the hydrogen combustion chamber, and that great advantage is gained by reducing the flow of oil and gases from the piston ring crevice volumes into the combustion chamber. We have discovered that this can be achieved by forcibly reducing the ambient pressure in the engine crankcase. This is preferably done with a vacuum pump, but can also be done with crankcase vent check valves, intake manifold vacuum, exhaust gas flow driven crankcase scavenging, etc., under some circumstances.

The invention overcomes the problem of abnormal combustion in hydrogen-fueled engines and allows internal combustion engines operated with hydrogen as the primary fuel to produce much lower emissions and higher efficiencies than those operated on petroleum-based fuels.

This invention allows hydrogen-fueled engines to operate at high loads without complex and expensive fuel injection systems. It further allows hydrogen-fueled engines to operate with low friction piston ring packages for better efficiency.

It has now been discovered that internal combustion engines fueled by hydrogen have, in the past, experienced abnormal combustion because of oil and gas leakage past the piston rings and into the combustion chambers. This invention overcomes the problem of abnormal combustion by controllably reducing the ambient pressure in the engine crankcase using, for example, a vacuum pump, or crankcase vent check valves, or the intake manifold vacuum, or by use of exhaust gas flow driven crankcase scavenging, or by other means.

This invention accordingly relates to the elimination of abnormal combustion in hydrogen-fueled engines by reducing the flow of oil and gases from the piston-ring crevice and into the combustion chamber. This is accomplished by reducing the ambient pressure in the engine crankcase. Pressure reduction is preferably performed using a vacuum pump, but equivalent pressure reduction means are also contemplated. The resulting engines operate at high loads without complex and expensive fuel injection systems.

OBJECTS OF THE INVENTION

It is an object of the invention to provide a hydrogen engine having pistons, wherein there is a tendency toward premature combustion in the combustion chamber, and to reduce or entirely eliminate that tendency.

Another object is to provide a hydrogen engine, and a method of operating the same, which operates successfully for long periods of time under heavy load.

Other objects and advantages will further become apparent hereinafter, and in the drawings.

BRIEF DESCRIPTION OF THE DRAWINGS

Turning now to the drawings.

DESCRIPTION OF SPECIFIC EMBODIMENT

Figure 1:
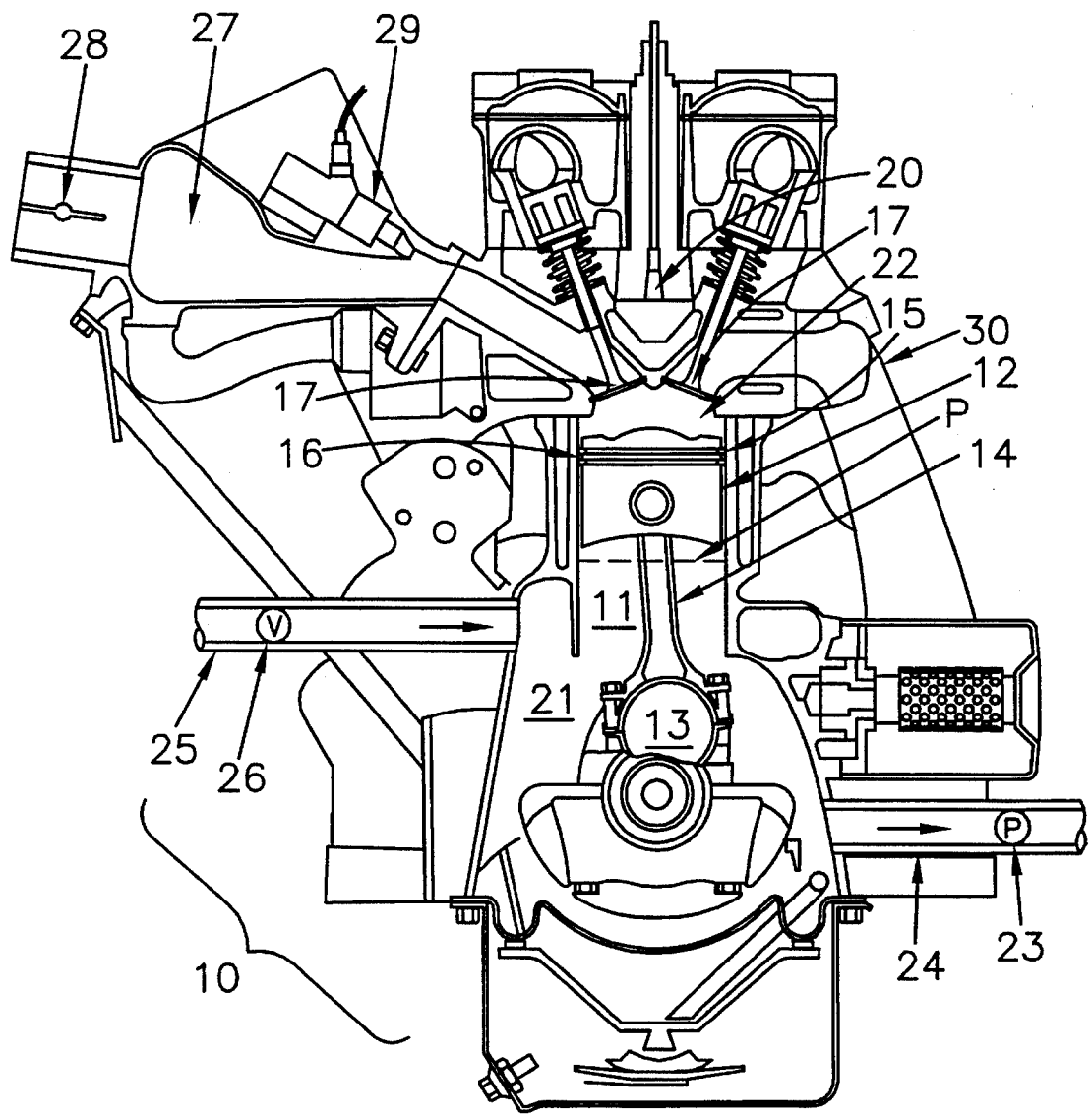
FIG. 1 is a sectional view of a typical engine embodying features of this invention, with certain portions broken away in order to reveal important features.

In the description which follows, specific terms and expressions will be used in the interest of clarity. These terms are not intended to define or to limit the scope of the invention, which is defined in the appended claims.

Turning to FIG. 1 of the drawings, the number 10 designates a typical engine shown in cross section and having a plurality of cylinders 11 containing pistons 12 mechanically connected to crankshaft 13 by means of connecting rods 14. V-type or other engine formats may be used as well. Engine 10 has a configuration that represents just one of many possible engine configurations, and is merely selected for purposes of illustration, with emphasis that any engine configuration can be used.

Each piston has rings 15, here shown as a plurality of rings having piston crevice volumes 16 between them. Valves 17 are provided for controlling the flow of incoming air and hydrogen, and plugs 20 are provided for igniting the hydrogen-air mixture in proper timing with the piston movements within the cylinder 11. The valves 17 also control the movement of the combustion products upon completion of the combustion cycle.

The number 21 designates the crankcase, which is shielded from the combustion chambers 22 by the pistons 12 and their rings 15. The crankcase 21 is capable of sustaining at least a partial vacuum.

Although it is intended that there be substantially complete isolation between the combustion chambers 22 on the one hand and the crankcase 21 on the other hand, there is in any typical engine, especially after extended wear, a migration of lubricant and gases across the piston rings in the direction of the combustion chamber 22. In normal gasoline engines this is only a minor problem, related primarily to consumption of lubricant, and well controlled by advanced engineering of the pistons, their rings and the cylinders in which they reciprocate. However it has been discovered in the special case of the hydrogen engine that even seemingly minor migration of lubricant or gases into the combustion chamber, especially after extended engine operation under a heavy load, seriously disturbs the timing of the combustion cycle and makes it difficult if not impossible to operate a full size hydrogen engine under substantial load for considerable periods of time.

In accordance with this invention, it has been found possible for the first time to operate such a hydrogen engine under heavy load for substantial periods of time.

Turning further to FIG. 1, the number 23 represents a vacuum pump connected into the crankcase 21 in a sealed relationship by the tubing 24.

In the operation of the engine, the usual four-stroke cycle is preferably used though two-stroke or other cycles may be used. Air and fuel are drawn through the intake valves 17 into the cylinders 11, with closure of the valves 17 in timed relationship under the usual cam action, with compression of each piston 12 until the air is fully or at least mostly compressed. The mix is then ignited by a spark plug 20 and the power stroke occurs. Thereafter, the exhaust valve opens and the resulting combustion products are expelled through the exhaust manifold, in the usual manner. Shortly before dead center has been reached, the air inlet valve 17 opens and the cycle is repeated. It is obvious this invention could be used with either premixed fuel and air or fuel and air mixed within the intake manifold. Additionally, it is obvious this invention could be used with direct cylinder injection whether ignition is by spark plug, glow plug or compression ignition.

The following is a summary of the design criteria found desirable for the high efficiency low NOx hydrogen-fueled engine of this invention:

1. The hydrogen-air equivalence ratio is held approximately constant at $\phi=1.0$.

2. Load is preferably controlled by operating the engine unthrottled and by recycling varying amounts of condensed exhaust gases into the inlet system. However, under light load conditions (BMEP less than 30 psi) some throttling is desirable.

3. A NOx reducing catalyst is desirably employed to reduce combustion gas NOx even further. A W. R. Grace Co. Davex 178 catalyst has been found to reduce NOx by as much as 90% at hydrogen-air equivalence ratios as lean as $\phi=0.98$.

It is important in accordance with this invention that the vacuum is applied at a location below the lowest point P of descent of the piston rings into the crankcase, which location is kept substantially sealed or separated from the combustion chamber by the pistons and their rings. This vacuum creates a reduction of ambient internal pressure in the crankcase and reduces or precludes potentially harmful flow of oil or gases from the piston ring crevice volumes 16 into the combustion chamber. This, in turn, minimizes the presence of such oil or gases in the combustion chamber and prevents premature combustion of oil or gases in the combustion chamber, and accordingly prevents consequent premature combustion of the hydrogen-air mixture. This is an important and advantageous feature of the invention since it enables the efficient and effective utilization of a hydrogen engine under heavy load for extended periods of time, all in an efficient manner and with excellent reliability.

Although this invention has been shown and described in connection with an engine of a kind frequently used with gasoline as a fuel, it can be applied to engines of many different types. Further, the utilization of this invention is not limited to a four-stroke cycle, but can be applied to two-stroke cycles, and others as well.

While FIG. 1 shows the combination of a vacuum pump 23 and tubing 24 below the oil filter, it will be appreciated that the vacuum pump 23 may be located at any position, so long as the vacuum applied by the pump 23 is applied at a location below the lowest point P of descent of the piston rings into the crankcase, at a location essentially completely isolated from the combustion chamber 22.

Vacuum pump 23 is preferably-a positive displacement pump designed to prevent back-flow of gases and/or vapors into the crankcase chamber after passing through the vacuum pump. Also, there is preferably an air inlet tube 25 provided to permit a limited amount of air flow into the crankcase. Such an air inlet tube 25 is preferably designed to permit access of limited air into the crankcase in an amount sufficient to conduct scavenging of the crankcase chamber while still maintaining a substantial vacuum. Air inlet tube 25 is preferably provided with a valve 26 adapted to control the amount and flow rate of air into crankcase 21. Valve 26 is optionally used to control the degree of vacuum within crankcase 21.

Engine 10 also includes a throttle 28, an intake manifold 27, and a fuel injector 29. An exhaust manifold 30 is provided for exhaust of combustion gases.

The vacuum within the crankcase chamber is most preferably maintained at about 5 inch Hg during operation of the hydrogen engine. Greater degrees of vacuum are, of course, contemplated, but they require additional energy input to the vacuum pump. Also, lesser degrees of vacuum are contemplated. Nonetheless, the vacuum in the crankcase chamber should preferably be greater than that generated by known crankcase scavenging systems (such as the PCV system disclosed by Stowe in U.S. Pat. No. 5,231,954, incorporated herein by reference) that use pressure differentials caused solely by the intake manifold. The air inlet is preferably provided in the crankcase chamber at a position away from the vacuum port to which the vacuum pump is connected. Such a position away from the vacuum port is preferably used to obtain the additional benefit of a sweep of gases through the crankcase chamber.

Hydrogen engines are known to operate at wide open throttle (unthrottled) during normal use, and under normal and heavy loads. At wide open throttle, the intake manifold generates little or no vacuum. Such vacuum generated by the intake manifold is generally not sufficient for use in this invention to reduce or eliminate migration of lubricants or combustion gases from the piston ring crevices into the combustion chambers. Even when a hydrogen engine is throttled, thereby causing the intake manifold to generate some vacuum, the operating conditions under which the hydrogen engine is throttled are not the operating conditions under which the crankcase vacuum is needed the most. It has been discovered that a vacuum in the crankcase chamber according to this invention is most helpful when the throttle is wide open. Under most conditions, the vacuum formed by the intake manifold in a hydrogen engine is usually insufficient to generate a crankcase vacuum of the magnitude required at the time it is most needed. Accordingly, it is important to use a suction means such as a vacuum pump or an equivalent device capable of generating a crankcase vacuum at least as great as a maximum vacuum generated by the intake manifold under normal and heavy hydrogen engine operating conditions.

Various modifications other than those heretofore discussed may be made in accordance with this invention. Changes of the hydrogen engine construction details and of the manner in which it is operated, all such changes being within the spirit and scope of the invention. For example, engines having various numbers and kinds of cylinders may be substituted, different forms of cylinders, pistons, connecting rods and crankshafts may be used, valve timing may be adjusted in a variety of different ways well known to persons skilled in the art, and other variations may be made, all without departing from the spirit and scope of this invention as defined in the appended claims.

What is claimed is:

1. In a hydrogen engine, said engine having inlet means for hydrogen and air, a cylinder connected to said inlet means, a piston connected to said cylinder for moving up and down between upper and lower limits within said cylinder, said piston having rings with piston crevice volume between them, valves, a combustion chamber, and a crankcase shielded from said combustion chamber by said piston rings, the combination which comprises:

sealing means substantially shielding said crankcase against ingress of air whereby said crankcase is capable of sustaining sub-atmospheric pressure therein, suction means connected to said crankcase for reducing ambient pressure in said crankcase at a location substantially completely isolated from said combustion chamber, said suction means being connected at a location below said lower limit of descent of said piston rings into said crankcase, thereby reducing ambient pressure in said crankcase and reducing or precluding flow of oil or gases from said piston ring crevice volume into said combustion chamber.

2. The hydrogen engine defined in claim 1, wherein said suction means is a vacuum pump connected to said crankcase.

3. The hydrogen engine defined in claim 1, wherein said sealing means includes a valve connected to limit said ingress of said air into said crankcase.

4. The hydrogen engine defined in claim 1, wherein said suction means includes a crankcase vent check valve.

5. The hydrogen engine defined in claim 1, wherein said suction means includes a means applying vacuum to said crankcase and connected to said crankcase from said inlet means.

6. The hydrogen engine defined in claim 1, wherein said suction means includes means for scavenging said crankcase.

7. In a method of controlling combustion in a hydrogen engine having inlet means for hydrogen and air, a cylinder, a piston mounted in said cylinder for movement between upper and lower limits in said cylinder, said piston having piston rings with piston crevice volume between them, valves, a crankcase and a combustion chamber, the step which comprises reducing ambient pressure in said crankcase at a location isolated from said combustion chamber and below said lower limit of movement of descent of said piston rings into said crankcase and thereby reducing or precluding flow of oil or gases from said piston ring crevice volume into said combustion chamber.

8. The method defined in claim 7, wherein said reducing step is performed by applying a vacuum to said crankcase.

9. The method defined in claim 8, wherein said reducing step is performed with a vacuum pump.

10. The method defined in claim 8, wherein said reducing step is performed with a crankcase vent check valve.

11. The method defined in claim 8, wherein said reducing step is performed with a means applying vacuum from said intake manifold.

12. The method defined in claim 8, wherein said reducing step is performed by scavenging said crankcase.

13. The method defined in claim 8, wherein said hydrogen engine is operated at an equivalence ratio of about 1.0, wherein load is controlled by operating unthrottled while recycling varying amounts of condensed exhaust gas into said inlet means, and wherein a NOx reducing catalyst is introduced.

* * * * *